US010439814B1

United States Patent
Grubin et al.

(10) Patent No.: US 10,439,814 B1
(45) Date of Patent: Oct. 8, 2019

(54) RESOURCE ADVERTISEMENT AND ROUTING VIA DISCOVERY CONFIGURATION

(71) Applicant: Amazon Technologies, Inc., Seattle, WA (US)

(72) Inventors: Benjamin Philip Grubin, Herndon, VA (US); Benjamin Samuel, Arlington, VA (US); Dalton James Nikitas, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 15/197,532

(22) Filed: Jun. 29, 2016

(51) Int. Cl.
*H04L 29/06* (2006.01)
*H04L 9/32* (2006.01)
*H04L 12/24* (2006.01)
*H04L 29/08* (2006.01)

(52) U.S. Cl.
CPC ............ *H04L 9/3213* (2013.01); *H04L 41/08* (2013.01); *H04L 41/12* (2013.01); *H04L 63/083* (2013.01); *H04L 67/10* (2013.01)

(58) Field of Classification Search
CPC ..... H04L 9/3213; H04L 63/083; H04L 67/10; H04L 41/12; H04L 41/08
See application file for complete search history.

(56) References Cited

U.S. PATENT DOCUMENTS

| 5,568,612 A * | 10/1996 | Barrett | H04L 12/28 709/203 |
| 6,061,356 A * | 5/2000 | Terry | H04L 12/4625 370/401 |
| 7,751,405 B1 * | 7/2010 | Kompella | H04L 12/4633 370/254 |
| 8,208,463 B2 * | 6/2012 | Yadav | H04L 12/1886 370/389 |
| 9,178,801 B1 * | 11/2015 | Guichard | H04L 12/6418 |
| 9,634,936 B2 * | 4/2017 | Bansal | H04L 45/30 |
| 2002/0035639 A1 * | 3/2002 | Xu | H04L 29/06 709/238 |
| 2002/0184357 A1 * | 12/2002 | Traversat | G06F 9/4416 709/223 |

(Continued)

OTHER PUBLICATIONS

Wikipedia, "Bonjour (software)," from Wikipedia, the free encyclopedia, retrieved on Oct. 4, 2017, from https://en.wikipedia.org/wiki/Bonjour_(software), 4 pages.

(Continued)

*Primary Examiner* — Christopher C Harris
(74) *Attorney, Agent, or Firm* — Davis Wright Tremaine LLP

(57) ABSTRACT

A resource generates and provides discovery configuration information to a network appliance. The network appliance validates the discovery configuration information, such as by validating a token within the discovery configuration information, then is configured using at least the discovery configuration information and passes at least a portion of the discovery configuration information to a network disjoint from that which connects the resource and the network appliance. This portion of discovery configuration information may include service advertisement information, routing information for traversing the network topology, and in some embodiments, the validation token.

20 Claims, 8 Drawing Sheets

(56) References Cited

U.S. PATENT DOCUMENTS

| | | | | |
|---|---|---|---|---|
| 2008/0159307 | A1* | 7/2008 | Roe | H04L 12/282 |
| | | | | 370/401 |
| 2008/0307516 | A1* | 12/2008 | Levy-Abegnoli | H04L 45/00 |
| | | | | 726/9 |
| 2012/0054848 | A1* | 3/2012 | Salowey | H04L 63/0823 |
| | | | | 726/10 |
| 2012/0226799 | A1* | 9/2012 | Kapur | G06F 9/5044 |
| | | | | 709/224 |
| 2012/0281706 | A1* | 11/2012 | Agarwal | H04L 67/1002 |
| | | | | 370/395.53 |
| 2015/0156630 | A1* | 6/2015 | Ankaiah | H04L 63/101 |
| | | | | 726/4 |
| 2015/0256404 | A1* | 9/2015 | Evans | H04L 67/16 |
| | | | | 709/224 |
| 2015/0312135 | A1* | 10/2015 | Moopath Velayudhan | |
| | | | | H04L 45/16 |
| | | | | 370/390 |
| 2017/0005928 | A1* | 1/2017 | Theogaraj | H04L 45/742 |
| 2017/0279717 | A1* | 9/2017 | Bethers | H04L 45/748 |

OTHER PUBLICATIONS

Wikipedia, "Service Advertising Protocol," from Wikipedia, the free encyclopedia, retrieved on Oct. 4, 2017, from https://en.wikipedia.org/wiki/Service_Advertising_Protocol, 2 pages.

Wikipedia, "Universal Plug and Play," from Wikipedia, the free encyclopedia, retrieved on Oct. 4, 2017, from https://en.wikipedia.org/wiki/Universal_Plug_and_Play, 10 pages.

Zeroconf, "Zero Configuration Networking (Zeroconf)," retrieved on Oct. 4, 2017, from http://www.zeroconf.org/, 6 pages.

* cited by examiner

RESOURCE ADVERTISEMENT AND ROUTING VIA DISCOVERY CONFIGURATION

BACKGROUND

Network-connected devices, resources, and services are proliferating alongside the increasing availability, reliability, and speed of network connectivity and technology. However, at the same time, the complexity of networks, as well as the configuration of such networks, is also dramatically increasing, at the same time as an increasing number network-connected devices are being purchased, installed, and configured by users with little or no technical expertise. Similarly, even in scenarios where resources and client devices are deployed in an environment requiring some level of technical ability, network connectivity and routing, especially when such connectivity traverses multiple disparate networks or links, can be difficult and/or time-consuming.

Several technologies have been created and implemented in an attempt to ameliorate these difficulties. For example, zero-configuration networking technologies, e.g., advertisement protocols, provide for the advertisement of available resources on the network to which a client device connects, and provision of usable network connectivity between such client devices and resources. However, these technologies do not provide connectivity and advertisement between client devices and resources on different links, networks, VLANs, or subnetworks.

As another example, route enablement protocols, such as Universal Plug and Play (UPnP), enables a host to instruct a router to open a path such that hosts on a remote network can reach a service on the local network. However, enterprise networks generally disallow such protocols due to security concerns, as the path remains open to all traffic rather than specifically that which is sought (i.e., between a given resource and a device on a different network), and in any case generally provide little or no advertisement or discoverability capabilities as between the available resource and the client device.

BRIEF DESCRIPTION OF THE DRAWINGS

Various techniques will be described with reference to the drawings, in which.

DETAILED DESCRIPTION

Figure 1:
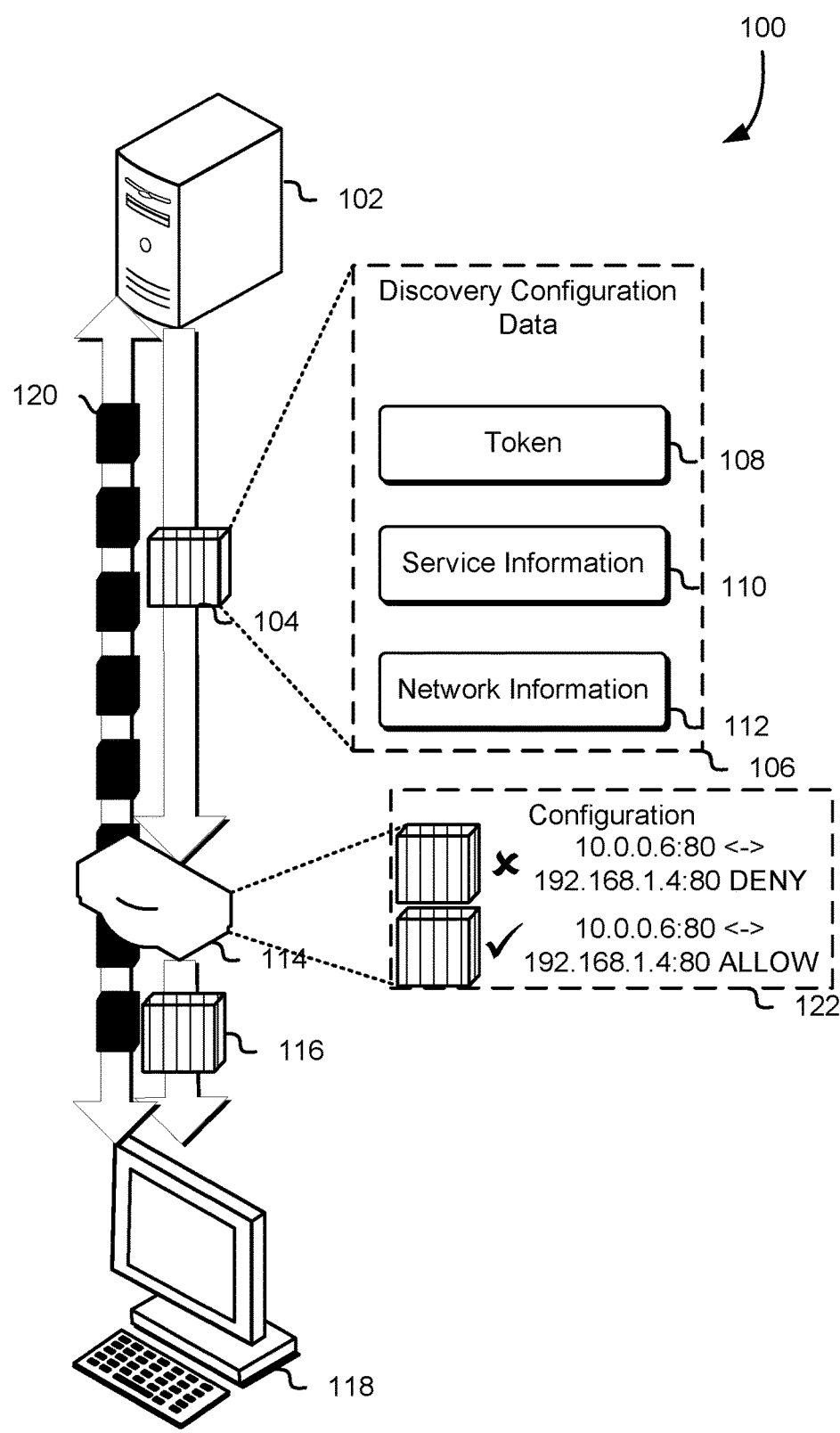
FIG. 1 illustrates an example in which a resource provides discovery configuration data to a router or other network appliance, so as to enable a client device on a different network to discover and be routed to the resource, in accordance with some embodiments.

In one example, discovery configuration data is used to advertise resources, such as computing services or computing hosts, to client devices or other endpoints on a different network. Additionally, the discovery configuration data may be used to configure routes between the endpoint(s) and the advertised resources, where such routes may span two or more disparate networks, subnetworks, VLANs, links, and the like.

For example, a resource may be configured to send discovery configuration data, such as service information identifying information regarding the service's capabilities, configuration, etc., network information identifying network routing and/or identification information regarding the resource, and, in some cases, a cryptographic token. The token may be requested by the resource from a granting authority if, for example, the administrator of the resource desires the resource to be advertised on networks of a computing resource service provider, on behalf of whom the granting authority provides authentication tokens. In such cases, the token may be provided by the granting authority on any number of validating conditions or criteria, such as an identity of the resource or the requestor, a level of data security and/or integrity provided by the resource, and the like.

The resource may send the discovery configuration data to a network appliance, such as a router, on the same network link or network as that of the resource (and which, in some cases, acts as a gateway to other networks to which the resource is to be advertised). The network appliance itself may be capable of interpreting the discovery configuration data and making decision(s) regarding the disposition of such data, as well as incoming (and outgoing) traffic to and from the resource. In cases where a token is sent by the resource, the network appliance may have the ability to validate the token as a condition to perform further steps regarding the discovery configuration data.

The network appliance may validate the discovery configuration data, such as by assessing the validity of the token, and upon validation, may update its configuration using at least some of the discovery configuration data. For example, the network appliance may open ports, update routing tables, etc., so as to reflect the contents of the network information received from the resource. By doing so, the network appliance may then be able to route incoming and outgoing traffic to and from the resource to different networks.

The network appliance may additionally send at least a portion of the discovery configuration data onward to some or all other networks to which it is connected. In some cases, the discovery configuration data sent to the other networks may include the token, the service information, and updated network information that indicates to the next hop (e.g., the next receiving device or network appliance) how to reach the sending network appliance. In some implementations, the network appliance may be configured so as to assess the token, which may only authorize the resource to be advertised to certain networks or network types, and accordingly forward the updated discovery configuration data to only those networks or network types on which the resource is authorized to advertise.

This process continues, with the discovery configuration data being sent to some or all other links/networks, whereupon other network appliances may process and validate such discovery configuration data, and forward further updated discovery configuration data onto the networks to which they are connected, until endpoints are reached or the discovery configuration data cannot be forwarded any further (e.g., if network appliances are not configured to handle such discovery configuration data, or if the discovery configuration data cannot be validated for further forwarding).

These endpoints receive the discovery configuration data and, at least by virtue of the service information contained therein, the resource is advertised as available for that endpoint to use. Additionally, the network information contained within the discovery configuration data enables the endpoint(s) to merely connect to the last hop in the fashion prescribed within the network information. By virtue of the network appliances along the path back to the resource having been configured to route traffic to the resource to the immediately preceding hop, the resource need not take any specific action other than to interact with the resource at the link-local address provided by the last hop.

As may be contemplated, a plurality of resources on a variety of networks may be configured to use a protocol enabled by such discovery configuration data. As a result, so long as there is a viable path for the plurality of resources to a given endpoint, many, if not all, of this plurality of resources may be advertised to the endpoint. To further simplify the selection of available resources to a given endpoint, some entity, such as a different endpoint on the same link/network as the endpoint, aggregates information (such as service information) from all resources advertising in the fashion just described and available to the endpoint, and presents such aggregated information via a programmatic or graphical user interface to the endpoint for selection. In some implementations, the aggregated information presented to a given endpoint may be merely advisory. In other implementations, the selection of a given advertised resource by one endpoint may be sent to the other endpoint providing the interface, at which point the interface-providing endpoint (or some other endpoint on the same link) intermediates the traffic between the target endpoint to the next hop on its way to and from the resource.

The aforementioned techniques improve security and ease of configuration for resources and endpoints seeking to connect with those resources. For example, routing tables need no longer be manually updated on a per-appliance basis, as the "snowball" effect enabled by these techniques occurs automatically. Additionally, validation-based (e.g., token-based) release of such service information from endpoint to endpoint obviates the need for opening a given port to all traffic, as it can be made specific to the resource, as well as to a given connection by an endpoint. From the endpoint's perspective, little or no manual configuration is necessary, as to the extent a given endpoint receives an advertisement of a resource, it can be assured that a connection to the advertising resource will be successful.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example 100 in which a resource provides discovery configuration data to a router or other network appliance, so as to enable a client device on a different network to discover and be routed to the resource, in accordance with some embodiments.

Discovery configuration data 106 is used to advertise a resource 102 on one network, link, subnetwork, VLAN, etc., to one or more client devices 118 or other endpoints on a different network, link, subnetwork, VLAN, etc. For example, the resource 102 may be configured to send the discovery configuration data 106, such as service information 110 identifying information regarding the service's capabilities, configuration, etc., network information 112 identifying network routing and/or identification information regarding the resource, and, in some cases, a cryptographic token 108.

The discovery configuration data may be sent as a packet 104 or series of packets that are distinguishable, e.g., by a network appliance 114 or resource 118, from other network packets sent on a given link, by virtue of its differing structure, content, and/or other characteristics. The receipt of such discovery configuration data (e.g., via packet(s)), may trigger an appropriately configured device, such as a network appliance 114 or endpoint 118, to perform routines specific to having detected the arrival of such data.

The resource 102 may be any entity capable of connecting to a network to provide access to its functionality. For example, the resource 102 may be a service, such as those described in connection with FIG. 7 below, provided by a computing resource service provider. As another example, the resource 102 may be a computer system, storage system, or other device, which provides capabilities, such as those similar to the services just described. Examples including media/storage server capabilities, computational capabilities, cryptographic capabilities, and the like.

Client device(s) 118 may be any entity capable of connecting to a network to interact with devices connected thereto. Examples include other services (e.g., as described in connection with FIG. 7), computer systems such as laptops, desktops, servers, smartphones, tablets, and the like, virtual machines and/or other virtualized computing instances such as those provided by a computing resource service provider, and the like.

The token 108 may be requested by the resource from a granting authority if, for example, the administrator of the resource 102 desires the resource 102 to be advertised on networks of a computing resource service provider, on behalf of whom the granting authority provides authentication tokens. In such cases, the token 102 may be provided by the granting authority on any number of validating conditions or criteria, such as an identity of the resource 102 or the requestor, a level of data security and/or integrity provided by the resource 102, and the like. Such a granting authority may, for example, be a cryptographic service or an authentication service such as described in connection with FIG. 7 below. In some embodiments, the granting authority may be a third party relative to the system implementing the techniques herein.

The service information 110 includes, in some embodiments, information regarding the service, capabilities, or resource identification to be offered/advertised. Examples include the name of the service, the capabilities of the service, and other information.

The network information 112 may including information regarding the network location and identification of the resource 102 (or, as described elsewhere herein, that of the immediately preceding hop). Examples including the IPv4 or IPv6 address of the resource 102, the protocol by which to connect to the resource 102 (e.g., TCP, UDP, etc.), the port at which the resource 102 may be contacted, and the like.

The discovery configuration data 106 may also include other types of data or metadata. Examples include information regarding the type of service offered, quality of service priority information, arbitrary data such as code executable by a receiving device (e.g., a network appliance 114), and the like.

The resource 102 may send the discovery configuration data 106, e.g., via a packet 104, to a network appliance 114, such as a router, on the same network link or network as that of the resource 102.

The network appliance 114 may be any device or service that directs network traffic between one network and another. In some cases, the network appliance 114 acts as a gateway to other networks to which the resource 102 is to be advertised. Examples include hardware routers, network gateways, firewalls, and the like. Other examples include routing services, such as those implemented by a computing resource service provider (e.g., instantiatable on demand by a running virtual machine or administrator thereof, so as to route traffic to and from virtual machines and other virtual machines, resources, physical hosts, the Internet, etc.).

The network appliance 114 is capable of interpreting the discovery configuration data 106 and making decision(s) regarding the disposition of such data, as well as incoming (and outgoing) traffic to and from the resource 102. In cases where a token 108 is sent by the resource 102, the network appliance may have the ability to internally (or externally, using a cryptography service or hardware cryptographic computation device, such as a hardware security module or trusted platform module), validate the token 108 as a condition to perform further steps regarding the discovery configuration data.

The network appliance 114 may validate the discovery configuration data 106, such as by assessing the validity of the token 108, and upon validation, may update its own configuration 122 using at least some of the discovery configuration data 106. For example, the network appliance may open ports, update routing tables, etc., so as to reflect the contents of the network information 106 received from the resource 102. By doing so, the network appliance may then be able to route incoming and outgoing traffic intended for (and emanating from) the resource 102 between different networks. In the illustrated example, the network appliance 114 updates configuration 122 to reflect that port 80 is open between resource 102 (10.0.0.6) and endpoint 118 (192.168.1.4) if the discovery configuration data is valid (denoted by the checkmark). However, if the discovery configuration data is invalid, or in the absence of the discovery configuration data (e.g., the state prior to having received valid discovery configuration data), port 80 remains closed (denoted by the 'X').

The network appliance 114 may additionally send at least a portion of the discovery configuration data 106 onward to some or all other networks to which it is connected. In some cases, the discovery configuration data 106 is sent in modified form 116 to the other networks may include the token 108, the service information 110, and updated network information 112 that indicates to the next hop (e.g., the next receiving device or network appliance) how to reach the sending network appliance 114. In some implementations, the network appliance 114 may be configured so as to assess the token 108, which may only authorize the resource 102 to be advertised to certain networks or network types, and accordingly forward the updated discovery configuration data 106 to only those networks or network types on which the resource 102 is authorized to advertise.

For example, the network appliance 114 may implement, or be under control of, one or more policies that drive or otherwise influence decisions made by the network appliance 114, e.g., with regard to the validity of the token 108, how to interpret network information 112 and service information 110, and/or which connected networks to which some or all of the discovery configuration data is to be propagated. The policy may be internal to the network appliance 114, provided by a policy management service such as that provided by a computing resource service provider, or administered in any applicable fashion such that the network appliance 114 utilizes the policy/policies in its decision and/or validation process.

In some embodiments, this process continues, with the discovery configuration data 106 being sent to some or all other links/networks, whereupon other network appliances may process and validate such discovery configuration data 106, and forward further updated discovery configuration data 106 onto the networks to which they are connected, until endpoints are reached or the discovery configuration data cannot be forwarded any further (e.g., if network appliances are not configured to handle such discovery configuration data, or if the discovery configuration data cannot be validated for further forwarding). This process is further described in connection with at least FIG. 2 below. However, in certain embodiments, the resource advertisement and path/routing enablement techniques described herein can be implemented on a single network link.

The endpoints, such as client device(s) 118, receive the discovery configuration data 106 (e.g., via a packet 116) and, at least by virtue of the service information 110 contained therein, the resource 102 is advertised as available for that endpoint to use. Additionally, the network information 112 contained within the discovery configuration data 106 enables the endpoint(s) 118 to merely connect to the last hop (e.g., in the illustrated example, the network appliance 114) in the fashion prescribed within the network information 112. By virtue of the network appliance(s) 114 along the path back to the resource 102 having been configured to route traffic to the resource 102 to the immediately preceding hop, the resource need not take any specific action other than to interact with the resource at the link-local address provided by the last hop so as to effectively open a connection 120 with the resource 102. From the endpoint's perspective, little or no manual configuration is necessary, as to the extent a given endpoint receives an advertisement of a resource, it can be assured that a connection to the advertising resource will be successful.

Figure 2:
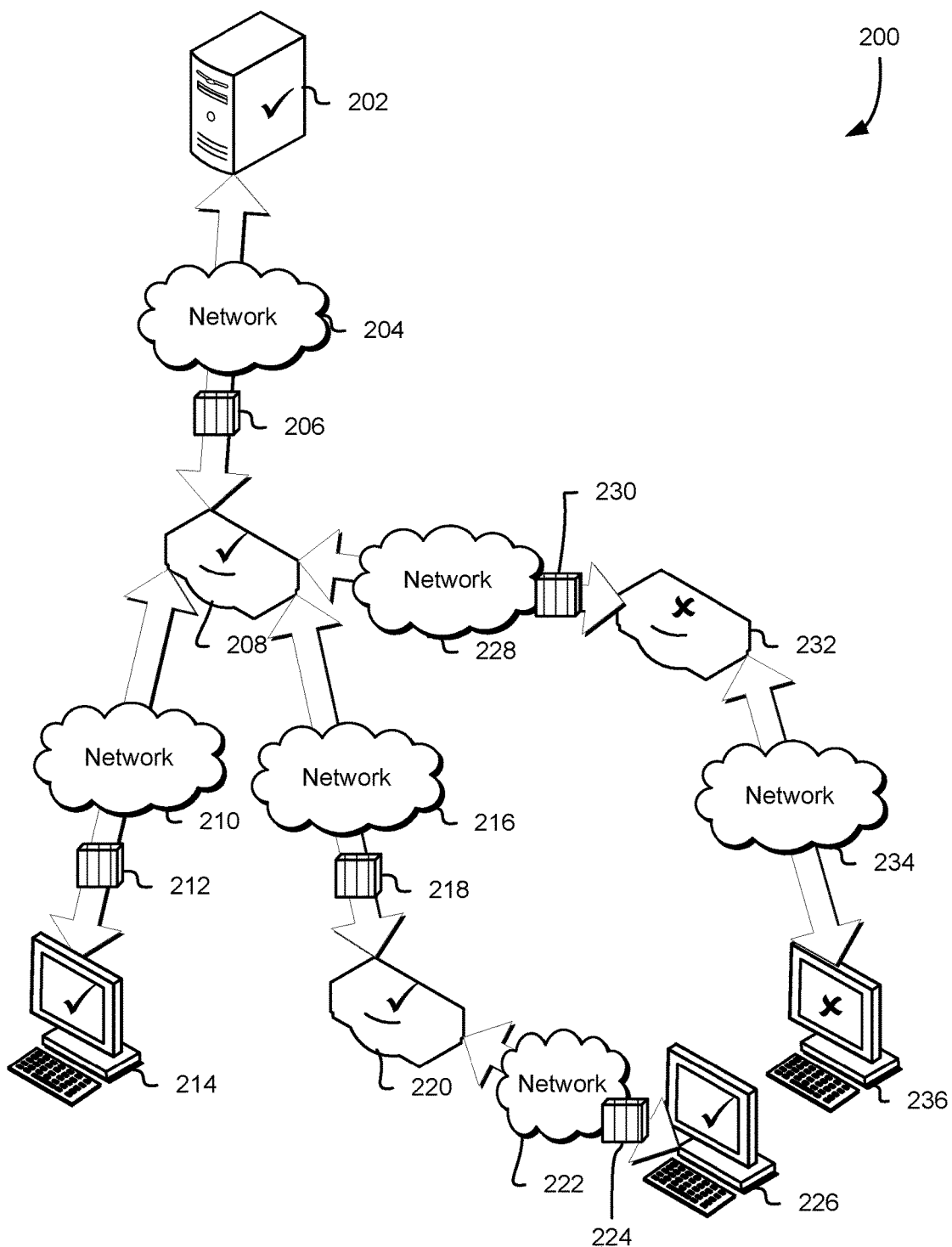
FIG. 2 illustrates an example in which a resource is made available to client devices on a plurality of different networks, based at least in part on configuration with discovery configuration data, in accordance with some embodiments.

FIG. 2 illustrates an example 200 in which a resource is made available to client devices on a plurality of different networks, based at least in part on configuration with discovery configuration data, in accordance with some embodiments.

A given resource 202 (with, e.g., a valid token applicable and validatable by at least some of the network appliances along potential paths to various endpoints), advertises and provides discovery configuration data 206 to a network appliance 208 via a network 204, in accordance with the techniques described at least in connection with FIG. 1. As mentioned, to the extent that the discovery configuration data 206 is validated by the network appliance 208, it then broadcasts (e.g., via IP multicast techniques, including the implementation and use of the Internet Group Management Protocol (IGMP)) at least a portion of the discovery configuration data 206 (e.g., including modified network information identifying itself as the most recent hop), to some or all other networks 210, 216, 228 to which it is connected.

In the case of the network 210, such discovery configuration data 212 reaches an endpoint 214, which effectively receives routing information and a service advertisement of resource 202 according to techniques previously described. In the case of the network 216, the discovery configuration data 218 is sent to another network appliance 220, which is able to validate the discovery configuration data 218, and thus pass on the discovery configuration data (e.g., in further modified form 224, to identify the network appliance 220 as the last hop), via its interconnected network 222 to an eventual endpoint 226, which similarly receives routing information and a service advertisement of resource 202.

In the case of the network 228, however, the discovery configuration data 230 is rejected by the network appliance 232. Reasons for the rejections include, for example, an insufficient level of privilege attributable to the token contained within the discovery configuration data 230 to further pass the broadcast, a lack of implementation of the validation and/or handling techniques described elsewhere herein in the network appliance 232, and the like. Accordingly, no further discovery configuration data is passed to the disparate network 234 to the endpoint 236, and thus, the resource is not advertised thereto.

As previously mentioned, networks connected to a given network appliance may be different at any level such that active routing, firewall opening, and/or network address translation must be performed by a network appliance that joins them. For example, networks may be on different subnets, be on different links (or of different link types), have different virtual LAN (VLAN) tags, be separated by a firewall (even if they are on the same logical network), and the like.

Figure 3:
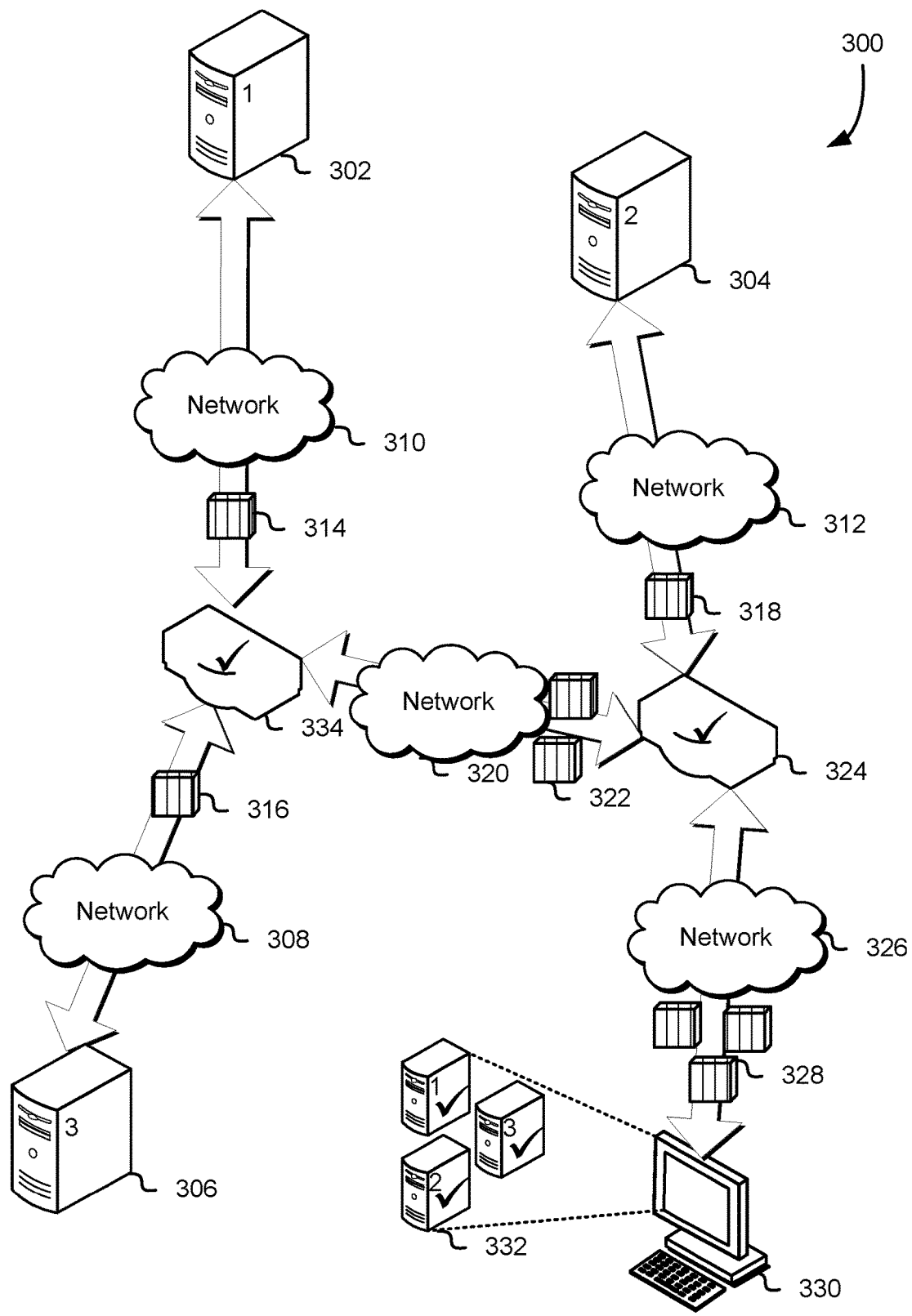
FIG. 3 illustrates an example in which a plurality of resources are made available and discoverable to a client device on a network that differs from at least one of those to which the plurality of resources connect, in accordance with some embodiments.

FIG. 3 illustrates an example 300 in which a plurality of resources on different networks are made available and discoverable to a client device, in accordance with some embodiments.

As may be contemplated, a plurality of resources on a variety of networks may be configured to use a protocol enabled by such discovery configuration data. As a result, so long as there is a viable path for the plurality of resources to a given endpoint, many, if not all, of this plurality of resources may be advertised to the endpoint.

For example, the resources 302, 304, 306 (labeled 1, 2, and 3 respectively) may be on different respective networks 310, 308, 312, respectively. Assuming that the illustrated network appliances 334, 324 are able to validate and process the discovery configuration data in the fashion described elsewhere herein, all advertisements 328 are available to an endpoint 330 on network 326 (e.g., network appliance 334 sends discovery configuration data 322 relating to the resources 302, 306 (e.g., corresponding to the received discovery configuration data 314, 316) via network 320 to the network appliance 324, which also receives and processes the discovery configuration data 318 from resource 304 via the network 312). Accordingly, the endpoint 330 is able to connect with all three resources 332. In some cases, the endpoint includes functionality that allows a user of the endpoint 330 to select, via a graphical user interface or programmatic interface (such as a web service call or API), some or all of the resources 332 to which to connect. In some embodiments, the selection of a given advertised resource may be automatically, rather than manually, selected, such as by a routine implemented on the endpoint 330.

In some embodiments, to further simplify the selection of the resources 332 available to a given endpoint 330, an entity, such as a different endpoint on the same link/network as the endpoint 330, aggregates information (such as service information) from all resources advertising in the fashion just described and available to the endpoint, and presents such aggregated information via a programmatic or graphical user interface to the endpoint 330 for selection. In some implementations, the aggregated information presented to a given endpoint 330 may be merely advisory, that is, available to the endpoint 330 by implication as it is available to a different endpoint on the same network/link. In other implementations, the selection of a given advertised resource by one endpoint may be sent to the other endpoint providing the interface, at which point the interface-providing endpoint (or some other endpoint on the same link) intermediates the traffic between the target endpoint to the next hop on its way to and from the resource.

Furthermore, it is contemplated that, in some embodiments, a given resource receives discovery configuration data from other resources in a similar fashion as an endpoint 330 (and, in such embodiments, a given resource may be conceptualized as just another endpoint 330). Accordingly, to the extent that a resource wishes to connect with another resource on a different network, in such embodiments, advertisements and connection routing may be made in a similar manner as the techniques just described.

Figure 4:
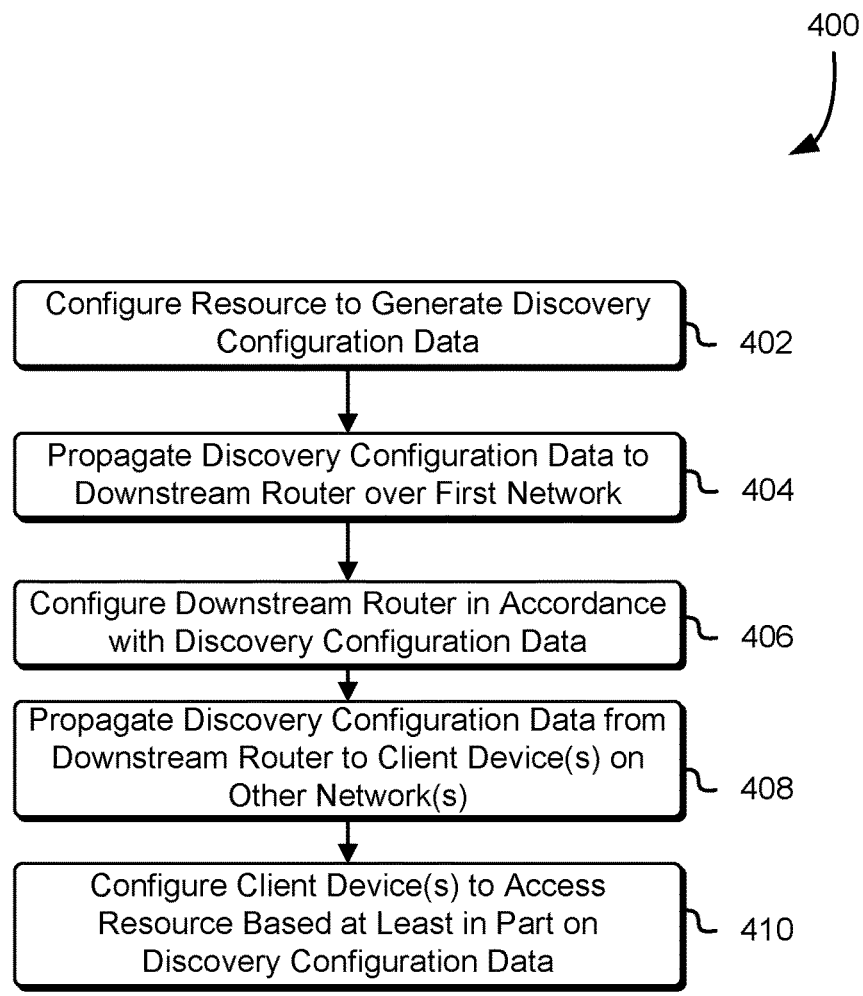
FIG. 4 illustrates an example process for configuring resources with discovery configuration data and propagating that data over a plurality of networks to provide a client device with information regarding the resources and routes and/or paths to the resources, in accordance with some embodiments.

FIG. 4 illustrates an example process 400 for configuring resources with discovery configuration data and propagating that data over a plurality of networks to provide a client device with information regarding the resources and routes and/or paths to the resources, in accordance with some embodiments.

At step 402, a resource is configured, such as by an implementing computing resource service provider, to generate discovery configuration data, such as that described above in connection with at least FIGS. 1-4. As previously mentioned, the resource may include a cryptographic token, such as that provided by an authority granting such tokens (and thus, conferring a level of trust to a holder of the token, with respect to a validating entity such as a receiving network appliance).

At step 404, the discovery configuration data is propagated by the resource to a downstream router or other network appliance over a first network, and at step 406, the downstream router is configured (e.g., by the implementing computing resource service provider, by itself via executable instructions that are triggered by receipt of the discovery configuration data, or using a payload of executable instructions contained within the discovery configuration data itself and executed by the network appliance) to update its functionality in accordance with the received discovery configuration data. Examples, as previously mentioned, include the updating of internal routing tables, opening of static routes, opening of firewall ports, network address translation, etc.

At step 408, the network appliance/router further propagates the discovery configuration data (e.g., in modified form as previously described, to indicate the source network appliance as the last hop) to other devices/network appliances on other networks. As previously mentioned, these other networks may be disjoint or otherwise different in any applicable way, such as being on different VLANs, subnets, links, etc. Also as previously mentioned, the propagation may be made via IP multicasting techniques.

At step 410, endpoints, such as client device(s), are then configured using at least the incoming discovery configuration data to access the resource advertised via the discovery configuration data. As previously mentioned, the client device(s) may only need to respond to the incoming discovery configuration data to be connected with the resource, with the path enablement and routing performed according to other techniques mentioned elsewhere herein.

Figure 5:
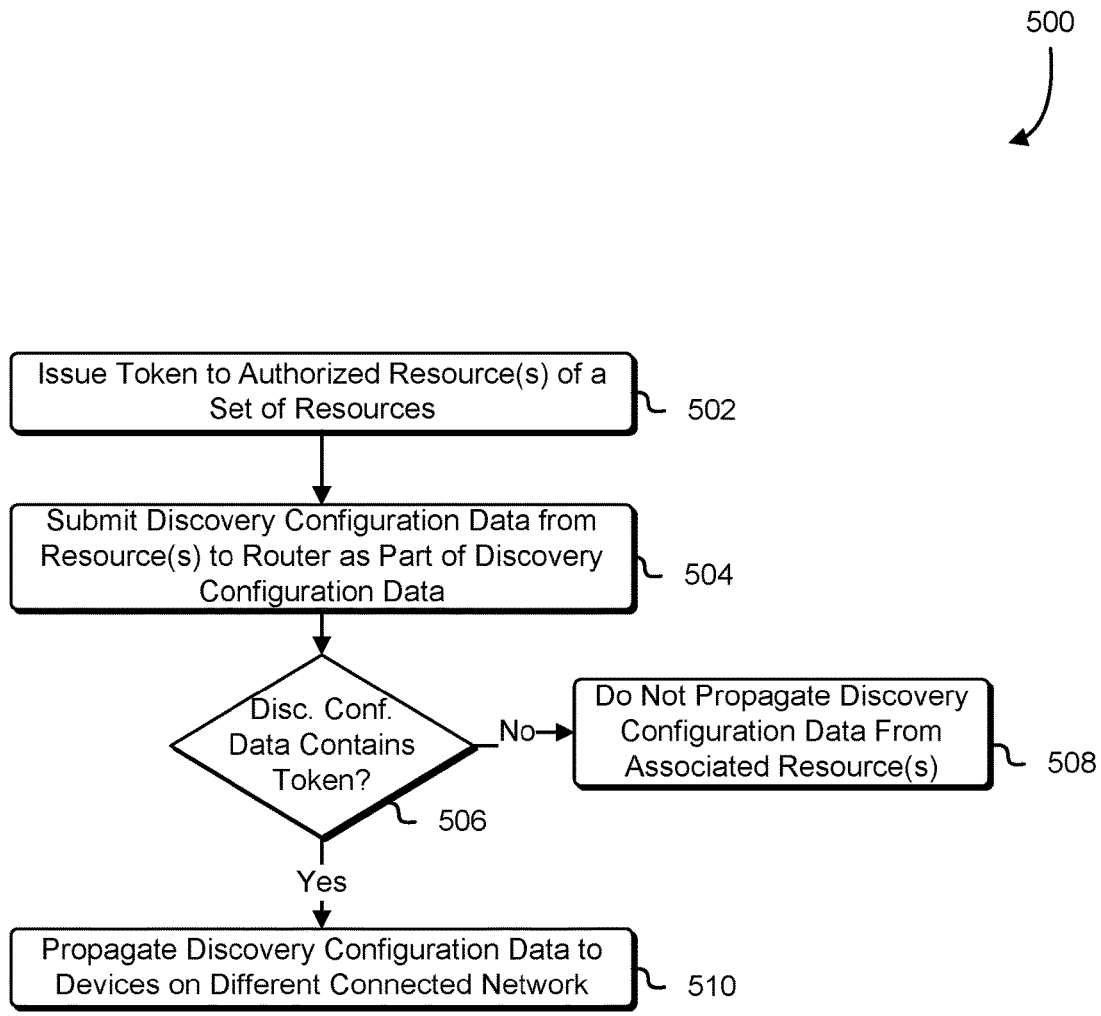
FIG. 5 illustrates an example process in which a router or other network appliance propagates discovery configuration data based on the presence and/or validity of a token in the discovery configuration data, in accordance with some embodiments.

FIG. 5 illustrates an example process 500 in which a router or other network appliance propagates discovery configuration data based on the presence and/or validity of a token in the discovery configuration data, in accordance with some embodiments.

At step 502, a cryptographic token is authorized, such as by an authentication or cryptography service, to an authorized resource of a set of resources available within or to an organization. As previously mentioned, the resources may be physical servers, or may be services provided by a computing resource service provider.

At step 504, discovery configuration data from the resource(s) are submitted to the router, where the aforementioned token in step 502 is provided as part of the discovery configuration data. At decision point 506, the network appliance/router assesses the discovery configuration data to determine its validity, such as by examining the token (e.g., validating the token, or merely checking for its presence). To the extent that the discovery configuration data is determined by the network appliance to be valid, at step 510, the discovery configuration data is further propagated (e.g., in modified form), to other networks and devices connected to the network appliance at issue. If the discovery configuration data is not valid, the discovery configuration data is prevented from further propagation at step 508.

Figure 6:
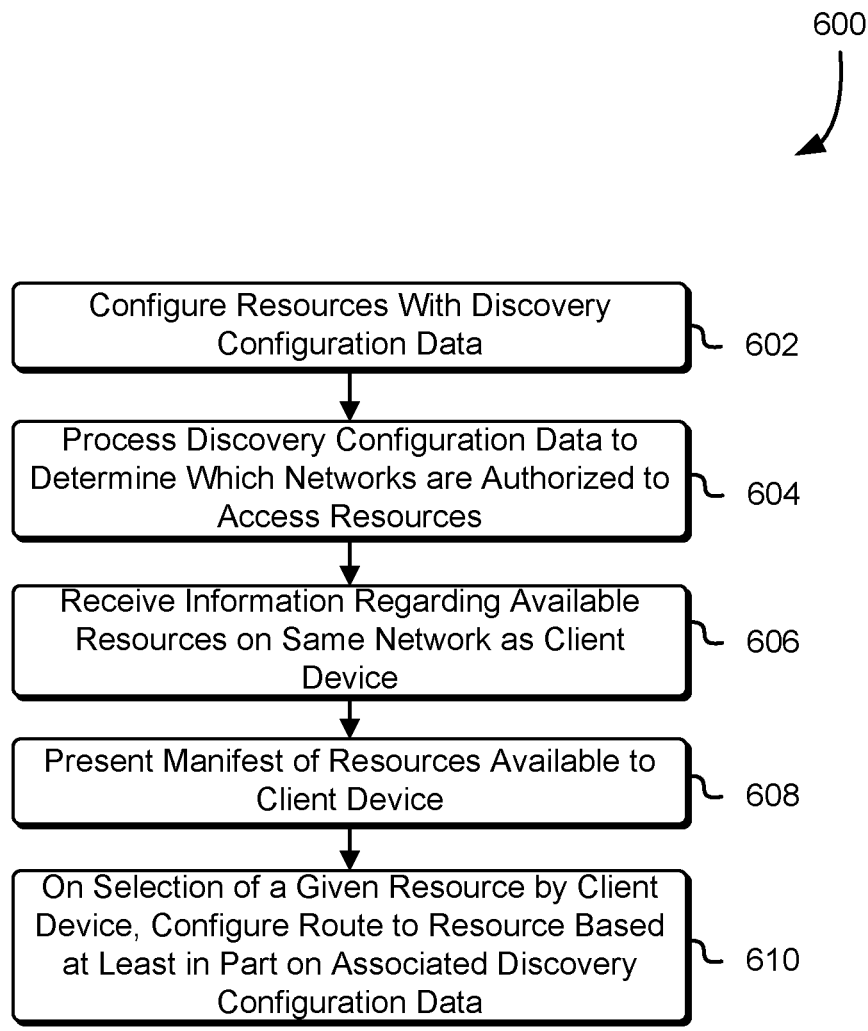
FIG. 6 illustrates an example process for providing advertisements for resources available and routable to a given client device on a different network from those to which the resources are connected, in accordance with some embodiments.

FIG. 6 illustrates an example process 600 for providing advertisements for resources available and routable to a given client device on a different network from those to which the resources are connected, in accordance with some embodiments;

At step 602, resources are configured with discovery configuration data, and such discovery configuration data is processed at step 604 so as to propagate such data to endpoints for which the resource(s) are authorized to advertise. Steps 602 and 604 may be performed according to the techniques described above, such as in connection with FIGS. 4 and 5.

At step 606, an entity, such as an endpoint, receives information, such as discovery configuration data (e.g., advertisements via service information and network information indicating the link-local address available to the endpoint by which to connect to the advertised resource(s)), and at step 608, aggregates such information and presents a manifest of selectable resources, such as via an interface (whether programmatic or graphical) to a client device. The client device may be separate from the aggregating endpoint but on the same network/link, or may be the same endpoint.

At step 610, in response to a selection by, e.g., a user of the endpoint, from amongst the available resources aggregated into the manifest in step 608, the discovery configuration data used, processed, and manipulated along the path between the resource and the selecting device, is used to enable routing of a connection between the endpoint/client device and the resource, according to techniques described above in connection with at least FIGS. 1-5.

Figure 7:
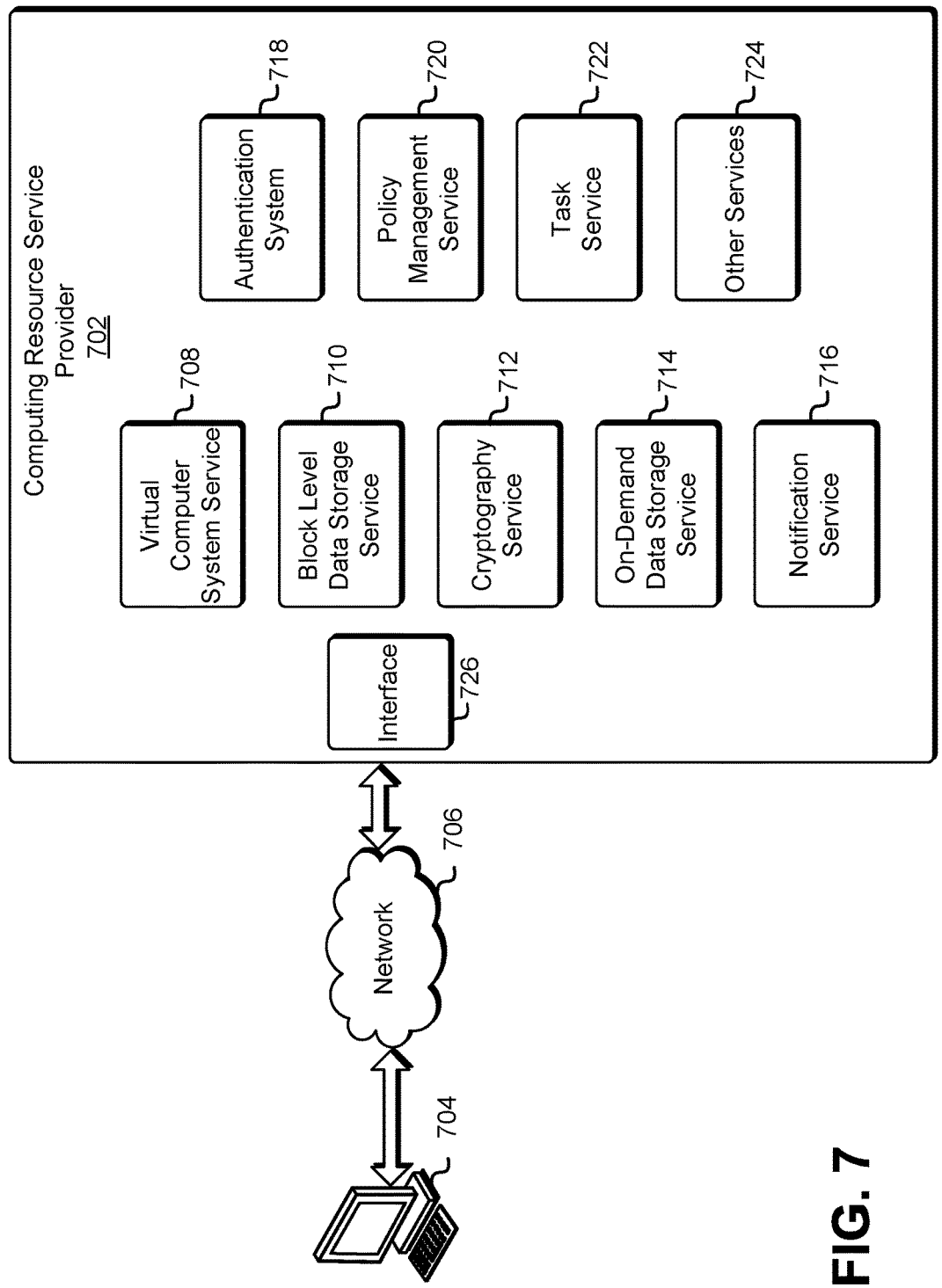
FIG. 7 illustrates an example environment in which a customer device is connected to and transacts requests with a computing resource service provider, in accordance with at least one embodiment.

FIG. 7 shows an example of a customer connected to a computing resource service provider in accordance with at least one embodiment. The computing resource service provider 702 may provide a variety of services to the customer 704 and the customer 704 may communicate with the computing resource service provider 702 via an interface 726, which may be a web services interface or any other type of customer interface. While FIG. 7 shows one interface 726 for the services of the computing resource service provider 702, each service may have its own interface and, generally, subsets of the services may have corresponding interfaces in addition to or as an alternative to the interface 726. The customer 704 may be an organization that may utilize one or more of the services provided by the computing resource service provider 702 to maintain and deliver information to its employees, which may be located in various geographical locations. Additionally, the customer 704 may be an individual that utilizes the services of the computing resource service provider 702 to deliver content to a working group located remotely. As shown in FIG. 7, the customer 704 may communicate with the computing resource service provider 702 through a network 706, whereby the network 706 may be a communication network, such as the Internet, an intranet or an Internet service provider (ISP) network. Some communications from the customer 704 to the computing resource service provider 702 may cause the computing resource service provider 702 to operate in accordance with one or more embodiments described or a variation thereof.

The computing resource service provider 702 may provide various computing resource services to its customers. The services provided by the computing resource service provider 702, in this example, include a virtual computer system service 708, a block-level data storage service 710, a cryptography service 712, an on-demand data storage service 714, a notification service 716, an authentication system 718, a policy management service 720, a task service 722 and one or more other services 724. It is noted that not all embodiments described include the services 708-724 described with reference to FIG. 7 and additional services may be provided in addition to or as an alternative to services explicitly described. As described, each of the services 708-724 may include one or more web service interfaces that enable the customer 704 to submit appropriately configured API calls to the various services through web service requests. In addition, each of the services may include one or more service interfaces that enable the services to access each other (e.g., to enable a virtual computer system of the virtual computer system service 708 to store data in or retrieve data from the on-demand data storage service 714 and/or to access one or more block-level data storage devices provided by the block level data storage service 710).

The virtual computer system service 708 may be a collection of computing resources configured to instantiate virtual machine instances on behalf of the customer 704. The customer 704 may interact with the virtual computer system service 708 (via appropriately configured and authenticated API calls) to provision and operate virtual computer systems that are instantiated on physical computing devices hosted and operated by the computing resource service provider 702. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 708 is shown in FIG. 7, any other computer system or computer system service may be utilized in the computing resource service provider 702, such as a computer system or computer system service that does not employ virtualization or instantiation and instead provisions computing resources on dedicated or shared computers/servers and/or other physical devices.

The block-level data storage service 710 may comprise one or more computing resources that collectively operate to store data for a customer 704 using block-level storage devices (and/or virtualizations thereof). The block-level storage devices of the block-level data storage service 710 may, for instance, be operationally attached to virtual computer systems provided by the virtual computer system service 708 to serve as logical units (e.g., virtual drives) for the computer systems. A block-level storage device may enable the persistent storage of data used/generated by a corresponding virtual computer system where the virtual computer system service 708 may only provide ephemeral data storage.

The computing resource service provider 702 also includes a cryptography service 712. The cryptography service 712 may utilize one or more storage services of the computing resource service provider 702 to store keys of the customers in encrypted form, whereby the keys may be usable to decrypt the customer 704 keys accessible only to particular devices of the cryptography service 712.

The computing resource service provider 702 further includes an on-demand data storage service 714. The on-demand data storage service 714 may be a collection of computing resources configured to synchronously process requests to store and/or access data. The on-demand data storage service 714 may operate using computing resources (e.g., databases) that enable the on-demand data storage service 714 to locate and retrieve data quickly, to allow data to be provided in responses to requests for the data. For example, the on-demand data storage service 714 may maintain stored data in a manner such that, when a request for a data object is retrieved, the data object can be provided (or streaming of the data object can be initiated) in a response to the request. As noted, data stored in the on-demand data storage service 714 may be organized into data objects. The data objects may have arbitrary sizes except, perhaps, for certain constraints on size. Thus, the on-demand data storage service 714 may store numerous data objects of varying sizes. The on-demand data storage service 714 may operate as a key value store that associates data objects with identifiers of the data objects which may be used by the customer 704 to retrieve or perform other operations in connection with the data objects stored by the on-demand data storage service 714.

In the environment illustrated in FIG. 7, a notification service 716 is included. The notification service 716 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 716 may provide notifications to clients using a "push" mechanism without the need to periodically check or "poll" for new information and updates. The notification service 716 may further be used for various purposes such as monitoring applications executing in the virtual computer system service 708, workflow systems, time-sensitive information updates, mobile applications, and many others.

As illustrated in FIG. 7, the computing resource service provider 702, in various embodiments, includes an authentication system 718 and a policy management service 720. The authentication system 718, in an embodiment, is a computer system (i.e., collection of computing resources) configured to perform operations involved in authentication of users of the customer. For instance, one of the services 708-716 and 720-724 may provide information from a user to the authentication system 718 to receive information in return that indicates whether the user requests are authentic.

The policy management service 720, in an embodiment, is a computer system configured to manage policies on behalf of customers (such as customer 704) of the computing resource service provider 702. The policy management service 720 may include an interface that enables customers to submit requests related to the management of policy. Such requests may be, for instance, requests to add, delete, change, or otherwise modify policy for a customer or for other administrative actions, such as providing an inventory of existing policies and the like.

The computing resource service provider 702, in various embodiments, is also equipped with a task service 722. The task service 722 is configured to receive a task package from the customer 704 and enable executing tasks as dictated by the task package. The task service 722 may be configured to use any resource of the computing resource service provider 702, such as one or more instantiated virtual machines or virtual hosts, for executing the task. The task service 722 may configure the one or more instantiated virtual machines or virtual hosts to operate using a selected operating system and/or a selected execution application in accordance with a requirement of the customer 704.

The computing resource service provider 702 additionally maintains one or more other services 724 based at least in part on the needs of its customers 704. For instance, the computing resource service provider 702 may maintain a database service for its customers 704. A database service may be a collection of computing resources that collectively operate to run one or more databases for one or more customers 704. The customer 704 may operate and manage a database from the database service by utilizing appropriately configured API calls. This, in turn, may allow a customer 704 to maintain and potentially scale the operations in the database. Other services include, but are not limited to, object-level archival data storage services, services that manage and/or monitor other services.

Figure 8:
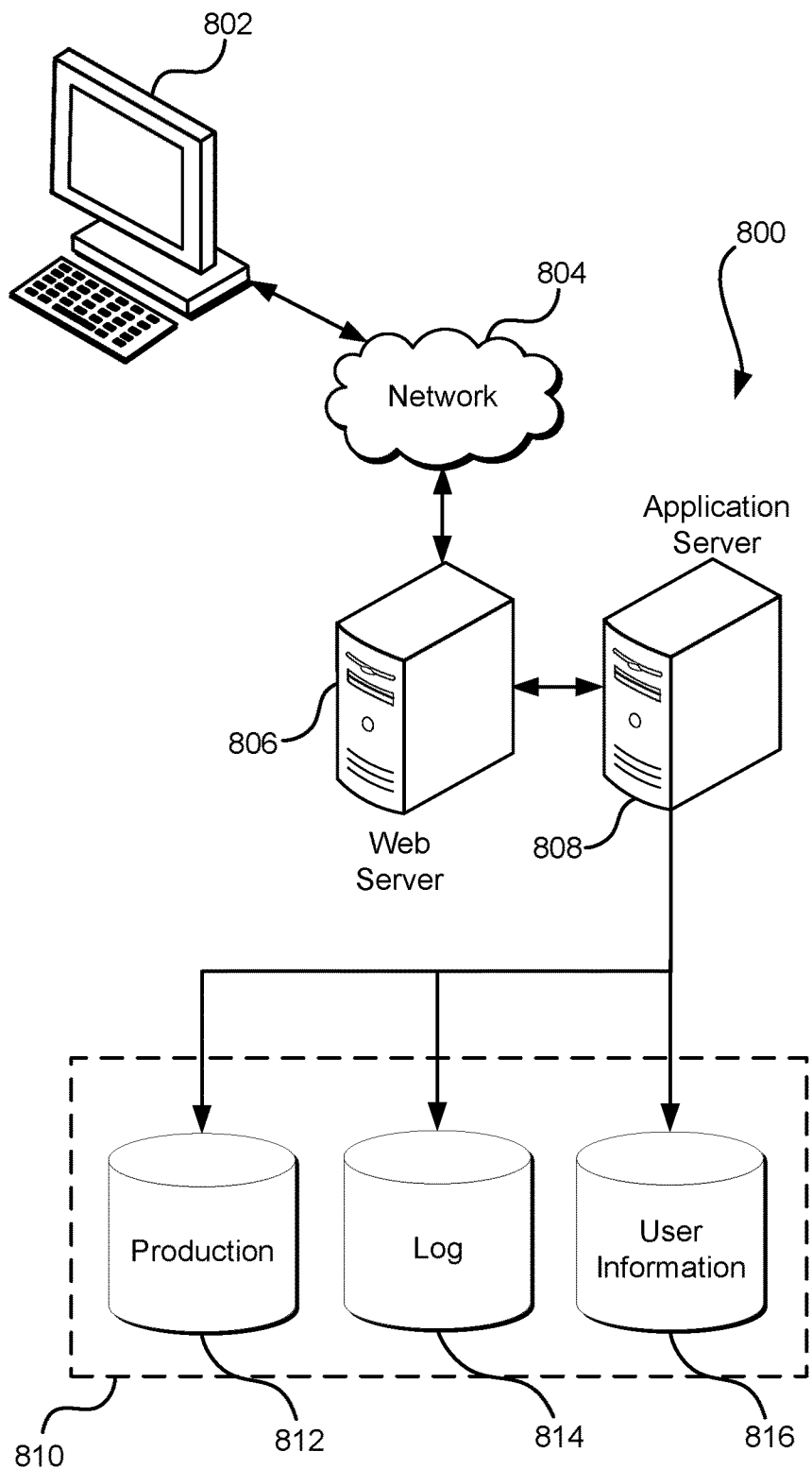
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a resource, a cryptographic token, the cryptographic token authenticating the resource for advertisement and routing by a first set of routers, the first set of routers in communication with at least a second network that differs in configuration than a first network used to connect the resource and a first router of the first set of routers;
   generating, by the resource, a first set of discovery configuration data that includes at least the cryptographic token, a first set of network information, and service information;
   submitting, by the resource to the first router, the first set of discovery configuration data, wherein the first router processes the first set of discovery configuration data by at least:
     determining whether the cryptographic token is valid; and
     as a result of the cryptographic token being valid and the first router being authorized to provide the first set of discovery configuration data to a second router, providing a second set of discovery configuration data to the second router of the first set of routers via the second network, the second router processing the second set of discovery configuration data by at least providing the second set of discovery configuration data to a client device connected to the second router, the second set of discovery configuration data including at least the service information, the cryptographic token, and a second set of network information that is at least partially disjoint from the first set of network information;

receiving, by the resource, a connectivity request, the connectivity request enabled by a selection by the client device that is based at least in part on the service information provided to the client device as part of the second set of discovery configuration data, the connectivity request being routed via the second router and the first router using at least the second set of network information and the first set of network information, respectively; and processing the connectivity request to establish a connection between the resource and the client device via at least the first router and the second router.

2. The computer-implemented method of claim 1, wherein validity of the cryptographic token is determined by a request to an authentication service.

3. The computer-implemented method of claim 1, wherein:
a first configuration of the first router is altered based at least in part on the first set of network information; and
a second configuration of the second router is altered based at least in part on the second set of network information.

4. The computer-implemented method of claim 1, wherein a third router of the set of routers rejects either the first set or second set of discovery configuration data based at least in part on a mismatch between the cryptographic token and a configuration associated with the third router.

5. A system, comprising:
a network appliance, storing non-transitory memory including executable instructions that, as a result of being executed by one or more processors of the network appliance, cause the network appliance to:
receive discovery configuration information from a resource connected to the network appliance via a first network connected to a first network interface of the network appliance, the discovery configuration information including at least service information and a first set of network information associated with the first network; and
process the discovery configuration information to determine whether the resource is authorized to provide, via the network appliance, the service information to a second network connected to a second network interface of the network appliance; and
as a result of determining the resource is authorized by at least validating a token included within the discovery configuration information, configure the network appliance to at least:
provide the service information and a second set of network information to the second network; and
route requests for the resource from the second network to the resource via the first network using at least the first set of network information.

6. The system of claim 5, wherein the token is provided to the resource by an authentication service connected with the resource.

7. The system of claim 5, wherein the service information includes a description of the resource to be provided to a client device connected via the second network.

8. The system of claim 5, wherein the executable instructions, as a result of being executed by the one or more processors, further cause the network appliance to provide the service information and the second set of network information to a different network appliance via the second network.

9. The system of claim 8, wherein the different network appliance processes the service information and the second set of network information by at least:
determining whether the resource is authorized to provide, via the different network appliance, the service information to a third network connected to the different network appliance; and
as a result of the resource being authorized, configuring the different network appliance to at least:
provide the second set of network information and a third set of network information to the third network; and
route requests for the resource from the third network to the second network using at least the second set of network information.

10. The system of claim 5, wherein the discovery configuration information is received in a form of at least one packet that differs in structure from all other packets used on the first network.

11. The system of claim 5, wherein the network appliance is a hardware network router.

12. The system of claim 5, wherein the first set of network information and the second set of network information enables a connection between a client device and the resource across at least the first network and second network.

13. A set of one or more non-transitory computer-readable storage media storing thereon executable instructions that, as a result of being executed by one or more processors of a computer system, cause the computer system to:
process service information from a network appliance, the service information associated with a plurality of resources available to the computer system, so as to provide an interface through which the computer system can select one or more resources of the plurality of resources for connection to the computer system, where the plurality of resources are connected to a set of networks that are disjoint from a second set of networks through which the computer system connects to the network appliance; and
connect, through the interface and based at least in part on the service information, to a selected resource via the interface, the set of networks, and the second set of networks, wherein the network appliance routes network data between the computer system, the set of networks, the second set of networks, and the network appliance, using at least a set of discovery configuration information provided to the network appliance by the resource, wherein the set of discovery configuration includes at least the service information and a cryptographic token used to authorize the network appliance to provide the set of discovery configuration information.

14. The set of one or more non-transitory computer-readable storage media of claim 13, wherein the set of discovery configuration information was validated by the network appliance prior to being configured to route the network data.

15. The set of one or more non-transitory computer-readable storage media of claim 14, wherein the network appliance validated the discovery configuration information by validating the cryptographic token included within the discovery configuration information and provided by an authentication service.

16. The set of one or more non-transitory computer-readable storage media of claim 13, wherein the plurality of resources includes at least one service provided by a computing resource service provider implementing the computer system.

17. The set of one or more non-transitory computer-readable storage media of claim 13, wherein the instructions further comprise instructions that, as a result of being executed by the one or more processors, cause the computer system to process the service information if at least one additional cryptographic token provided by the network appliance is determined to be valid.

18. The set of one or more non-transitory computer-readable storage media of claim 17, wherein the at least one additional cryptographic token is provided to the network appliance by the plurality of resources.

19. The set of one or more non-transitory computer-readable storage media of claim 13, wherein the interface is a graphical user interface.

20. The set of one or more non-transitory computer-readable storage media of claim 13, wherein the interface is an application programming interface.

* * * * *